United States Patent
Morikawa et al.

(10) Patent No.: US 11,560,514 B2
(45) Date of Patent: Jan. 24, 2023

(54) METHOD FOR PRODUCING β-SIALON FLUORESCENT MATERIAL

(71) Applicant: NICHIA CORPORATION, Anan (JP)

(72) Inventors: Motoharu Morikawa, Tokushima (JP); Shoji Hosokawa, Tokushima (JP)

(73) Assignee: NICHIA CORPORATION, Anan (JP)

( * ) Notice: Subject to any disclaimer, the term of this patent is extended or adjusted under 35 U.S.C. 154(b) by 525 days.

(21) Appl. No.: 16/454,917

(22) Filed: Jun. 27, 2019

(65) Prior Publication Data
US 2020/0002605 A1 Jan. 2, 2020

(30) Foreign Application Priority Data
Jun. 27, 2018 (JP) .............................. JP2018-122408

(51) Int. Cl.
*C09K 11/77* (2006.01)
*C09K 11/08* (2006.01)
(Continued)

(52) U.S. Cl.
CPC ........ *C09K 11/0883* (2013.01); *C04B 35/597* (2013.01); *C04B 35/62675* (2013.01); *C04B 35/6303* (2013.01); *C09K 11/7728* (2013.01); *C04B 2235/3869* (2013.01); *C04B 2235/408* (2013.01); *C04B 2235/6562* (2013.01); *C04B 2235/767* (2013.01)

(58) Field of Classification Search
CPC ............ C09K 11/7728; C09K 11/7734; C09K 11/77342; C09K 11/77344; C09K 11/77346; C09K 11/77347; C09K 11/77348
See application file for complete search history.

(56) References Cited

U.S. PATENT DOCUMENTS

| 7,544,310 | B2 | 6/2009 | Hirosaki |
| 7,678,294 | B2 | 3/2010 | Hirosaki |

(Continued)

FOREIGN PATENT DOCUMENTS

| JP | 2003160782 A | 6/2003 |
| JP | 2005255895 A | 9/2005 |

(Continued)

*Primary Examiner* — Matthew E. Hoban
(74) *Attorney, Agent, or Firm* — Hunton Andrews Kurth LLP (57) ABSTRACT

Provided is a method for producing a β-sialon fluorescent material, comprising preparing a composition containing a silicon nitride that contains aluminium, oxygen, and europium; heat-treating the composition at a temperature in a range of 1300° C. or more and 1600° C. or less to obtain a heat-treated product; subjecting the heat-treated product to a temperature-decrease of from the heat treatment temperature to 1000° C. as a first temperature-decrease step; and subjecting the heat-treated product to a temperature-decrease of from 1000° C. to 400° C. as a second temperature-decrease step. The first temperature-decrease step has a temperature-decrease rate in a range of 1.5° C./min or more and 200° C./min or less, and the second temperature-decrease step has a temperature-decrease rate in a range of 1° C./min or more and 200° C./min or less.

14 Claims, 2 Drawing Sheets

(51) Int. Cl.
*C04B 35/597* (2006.01)
*C04B 35/626* (2006.01)
*C04B 35/63* (2006.01)

(56) References Cited

U.S. PATENT DOCUMENTS

| | | | |
|---|---|---|---|
| 7,780,872 B2 | 8/2010 | Hirosaki | |
| 2007/0108896 A1 | 5/2007 | Hirosaki | |
| 2009/0129052 A1 | 5/2009 | Hirosaki | |
| 2009/0153028 A1 | 6/2009 | Hirosaki | |
| 2010/0053932 A1* | 3/2010 | Emoto | C09K 11/0883 362/84 |
| 2010/0213820 A1* | 8/2010 | Sakai | C04B 35/6268 313/501 |
| 2011/0198656 A1* | 8/2011 | Emoto | C09K 11/7734 257/98 |
| 2012/0211700 A1* | 8/2012 | Ichikawa | C09K 11/7734 252/301.4 R |
| 2012/0223448 A1* | 9/2012 | Nomiyama | C04B 41/009 264/1.21 |
| 2012/0228551 A1* | 9/2012 | Emoto | C09K 11/0883 252/301.4 R |
| 2012/0305844 A1* | 12/2012 | Emoto | C09K 11/0883 252/301.4 F |
| 2016/0355731 A1* | 12/2016 | Aoyagi | C09K 11/0883 |
| 2017/0037311 A1* | 2/2017 | Hosokawa | C09K 11/0883 |
| 2017/0166810 A1* | 6/2017 | Morikawa | C09K 11/7734 |
| 2017/0342321 A1* | 11/2017 | Aoyagi | C09K 11/0883 |

FOREIGN PATENT DOCUMENTS

| | | |
|---|---|---|
| JP | 2011174015 A | 9/2011 |
| JP | 2013173806 A | 9/2013 |
| JP | 2017110206 A | 6/2017 |
| JP | 2017214551 A | 12/2017 |
| WO | 2012/086505 A1 | 6/2012 |

* cited by examiner

METHOD FOR PRODUCING β-SIALON FLUORESCENT MATERIAL

CROSS-REFERENCE TO RELATED PATENT APPLICATION

This application claims priority to Japanese Patent material No. 2018-122408, filed on Jun. 27, 2018, the disclosure of which is hereby incorporated reference its entirety.

BACKGROUND

Technical Field

The present invention relates to a method for producing a β-s ialon fluorescent material. In this specification, the "fluorescent material" is used in the same meaning as a "fluorescent phosphor".

Description of the Related Art

Light-emitting devices including a light-emitting diode in combination with a fluorescent material are increasingly used in, for example, lighting, backlighting for liquid crystal displays, and small strobe lighting.

As an example of the fluorescent material to be used in combination with a light-emitting diode, sialon fluorescent materials have been proposed. A sialon fluorescent material is silicon nitride in which aluminium, oxygen, and europium are solid-solubilized. Sialon fluorescent materials are classified into α-type-sialon fluorescent materials and β-type-sialon fluorescent materials (hereinafter also referred to as "β-sialon fluorescent material") by the difference in crystal structure of silicon nitride, or the basic component. A β-sialon fluorescent material is a green fluorescent material that emits light with a peak emission wavelength in the range of from 520 nm to 560 nm when excited by light in a wide wavelength range of from near-ultraviolet light to blue light.

A β-sialon fluorescent material has a chemical composition represented by, for example, $Si_{6-z}Al_zO_zN_{8-z}$:Eu ($0<z\leq4.2$) as described in Japanese Unexamined Patent Publication No. 2005-255895. A β-sialon fluorescent material is obtained by mixing silicon nitride ($Si_3N_4$), aluminium nitride (AlN), aluminium oxide ($Al_2O_3$), and europium oxide ($Eu_2O_3$) as an activator in a predetermined molar ratio, and firing the mixture at a temperature of 1800° C. or more.

SUMMARY

β-sialon fluorescent materials are to be further improved in emission intensity. Also, β-sialon fluorescent materials are desired to have a narrower full width at half maximum (FWHM) of light emission spectrum for improved color reproducibility when used in a light-emitting device as backlighting for a liquid crystal display. A full width at half maximum (FWHM) indicates a wavelength width of the light emission peak showing a value of 50% of the maximum light emission peak of the light emission spectrum.

An embodiment of the present disclosure is directed to a method for producing a β-sialon fluorescent material having a narrow full width at half maximum, and a higher emission intensity.

The method for producing a β-sialon fluorescent material according to an embodiment of the present disclosure includes preparing a composition containing a silicon nitride that contains aluminium, oxygen, and europium, heat-treating the composition at a temperature in a range of 1300° C. or more and 1600° C. or less to obtain a heat-treated product, subjecting the heat-treated product to a temperature decrease from the heat treatment temperature to 1000° C. as a first temperature-decrease step, and subjecting the heat-treated product to a temperature decrease from 1000° C. to 400° C. as a second temperature-decrease step. The first temperature-decrease step has a temperature-decrease rate in a range of 1.5° C./min or more and 200° C./min or less, and the second temperature-decrease step has a temperature-decrease rate in a range of 1° C./min or more and 200° C./min or less.

The embodiment of the present disclosure provides a method for producing a β-sialon fluorescent material having a light emission spectrum with a narrower full width at half maximum, and a higher emission intensity.

DETAILED DESCRIPTION

The method for producing a β-sialon fluorescent material according to the present embodiment of present disclosure are hereunder described. However, the embodiments described below are mere examples for embodying the technical concept of the present invention, and the present invention is not limited to the method for producing a β-sialon fluorescent material described below. The relationship between the color names and the chromaticity coordinates, the relationship between the wavelength ranges of light and the color names of monochromatic light, and others are in accordance with Japanese Industrial Standard (JIS) Z 8110.

Method for Producing a β-Sialon Fluorescent Material

The method for producing a β-sialon fluorescent material includes preparing a composition containing a silicon nitride that contains aluminium, oxygen, and europium (hereinafter also referred to as "preparation step"), heat-treating the composition at a temperature in a range of 1300° C. or more and 1600° C. or less to obtain a heat-treated product (hereinafter also referred to as "heat treatment step"), subjecting the heat-treated product to a temperature decrease from the heat treatment temperature to 1000° C. as a first temperature-decrease step, and subjecting the heat-treated product to a temperature decrease from 1000° C. to 400° C. as a second temperature-decrease step. The first temperature-decrease step has a temperature-decrease rate in a range of 1.5° C./min or more and 200° C./min or less, and the second temperature-decrease step has a temperature-decrease rate in a range of 1° C./min or more and 200° C./min or less. The term "temperature-decrease rate" as used herein refers to an average temperature-decrease rate obtained by dividing the temperature range of from temperature t1 (° C.), or the temperature before a temperature decrease, to temperature t2 (° C.), or a target temperature, (t1>t2) by the time m (min) taken for the temperature decrease. The temperature-decrease rate is represented by numerical formula (1) below. Temperature t1, or the temperature before a temperature decrease, and temperature t2, or a target temperature, both specifically refer to a temperature of the atmosphere within the furnace in which the heat-treated product is arranged.

$$\text{Temperature decrease rate}(°\text{C./min}) = (t1 - t2)/m \qquad (1)$$

Preparation Step

The composition prepared in the preparation step contains silicon nitride containing aluminium, oxygen, and europium. The composition preferably contains a β-sialon fluorescent material having a chemical composition represented by formula (I):

$$Si_{6-z}Al_zO_zN_{8-z}:Eu_y \qquad (I)$$

In formula (I), y and z each satisfy $0<y\leq 1.0$ and $0<z\leq 4.2$.

The composition is preferably a β-sialon fluorescent material having a chemical composition represented by formula (I). The composition may be a commercial β-sialon fluorescent material, or may be prepared by mixing the raw materials and calcining the mixture of the raw materials in a manner to allow the resulting β-sialon fluorescent material to have a chemical composition represented by formula (I). In formula (I), the parameter y represents the molar ratio of europium, or the activating element of a β-sialon fluorescent material having a chemical composition represented by formula (I). The "molar ratio" expresses a molar amount of each element contained in one mole of the chemical composition of the fluorescent material. In the formula (I), the parameter z represents the molar ratio of aluminium or oxygen.

In the chemical composition represented by formula (I), the parameter y represents the molar ratio of Eu as an activating element. The parameter y is in a range of greater than 0 and 1.0 or less ($0<y\leq 1.0$), preferably in a range of 0.0001 or more and 0.5 or less ($0.0001\leq y\leq 0.5$), more preferably in a range of 0.0005 or more 0.1 or less ($0.0005\leq y\leq 0.1$), and still more preferably in a range of 0.001 or more 0.1 or less ($0.001\leq y\leq 0.1$). In formula (I), the parameter z represents the molar ratio of Al or O. In the chemical composition represented by formula (I), the parameter z is in a range of greater than 0 and 4.2 or less ($0<z\leq 4.2$), preferably in a range of 0.0001 or more and 1.0 or less ($0.0001\leq z\leq 1.0$), more preferably in a range of 0.0001 or more and 0.5 or less ($0.0001\leq z\leq 0.5$), still more preferably in a range of 0.0005 or more and 0.5 or less ($0.0005\leq z\leq 0.5$), and particularly preferably in a range of 0.001 or more and 0.3 or less ($0.001\leq z\leq 0.3$).

To produce a β-sialon fluorescent material having a chemical composition represented by formula (I) as the composition, metal aluminium or an aluminium-containing compound, europium or a europium-containing compound, and silicon nitride as raw materials may be mixed in a manner to satisfy the chemical composition represented by formula (I), and the resulting raw material mixture may be calcined, for example, at a temperature of from 1850° C. to 2100° C.

The raw material mixture is calcined at a temperature preferably in a rage of 1900° C. or more and 2050° C. or less, more preferably in a range of 1920° C. or more and 2050° C. or less, and still more preferably in a range of 1950° C. or more and 2050° C. or less. The raw material mixture may be calcined in an atmosphere preferably containing nitrogen gas, more preferably containing nitrogen gas in an amount of 90% by volume or more, and still more preferably containing nitrogen gas in an amount of 95% by volume or more. The raw material mixture may be calcined twice or more. In this case, each calcining temperature is preferably in a range of 1850° C. or more and 2100° C. or less. The time to be taken for increasing the temperature at each calcining may be, for example, in a range of 1 hour or more and 48 hours or less. The retention time at a calcining temperature may be, for example, in a range of 1 hour or more and 48 hours or less. The duration of each calcining is preferably in a range of 2 hours or more and 24 hours or less, and more preferably in a range of 3 hours or more and 20 hours or less. The pressure of the atmosphere at each calcining may be from normal pressure to 200 MPa, and is preferably in the range of 0.1 MPa or more and 200 MPa or less to reduce decomposition of the resulting β-sialon fluorescent material. The resulting calcined product may be subjected to particle size regulation through, for example, crushing, pulverizing, and classifying after having been cooled to room temperature.

Examples of the aluminium-containing compound to be used as a raw material include AlN, $Al_2O_3$, and $Al(OH)_3$. Examples of the europium-containing compound include $Eu_2O_3$, EuN, and $EuF_3$. The metals or the metal compounds to be used as a raw material may have an average particle diameter of powder usually used, for example, in a range of 0.01 μm or more and 20 μm or less. The raw material mixture may contain a flux, such as a halide, as appropriate. When a flux is contained, reaction among the raw materials is further accelerated in the raw material mixture, and a solid phase reaction proceeds uniformly. Examples of the halide include chlorides and fluorides of rare-earth metals, alkali earth metals, and alkali metals.

The calcined product obtained through the calcining step may be subjected to particle size regulation through, for example, crushing, pulverizing, and classifying. Or a size-adjusted β-sialon fluorescent material having a chemical composition represented by formula (I) may be used.

Heat-Treating Step

In the heat treatment step, a composition prepared in the preparation step and containing a silicon nitride that contains aluminium, oxygen, and europium is heat-treated at a temperature in a range of 1300° C. or more and 1600° C. or less to obtain a heat-treated product. As used herein, the temperature for the heat treatment specifically refers to a temperature of the atmosphere within the furnace in which the composition is arranged. In the heat treatment step, a composition containing a silicon nitride that contains aluminium, oxygen, and europium, or preferably a β-sialon fluorescent material having a chemical composition represented by formula (I), is heat-treated at a temperature in the range of 1300° C. or more and 1600° C. or less to at least partially thermally decompose an unstable phase contained in the composition. Such an unstable phase may contribute to reducing emission intensity. Through the heat treatment step, the unstable phase in the composition, or preferably in the β-sialon fluorescent material having a chemical composition represented by formula (I), is at least partially decomposed, and thus a more stable heat-treated product is obtained. An unstable phase in the composition as used herein refers to a phase containing an amorphous part, or a low crystalline part with a high dislocation and defect density. At a heat treatment temperature of less than 1300° C., the unstable phase in the composition cannot be decomposed easily. At a heat treatment temperature of more than 1600° C., the crystal structure of the composition may be destroyed. The temperature at which the composition is heat-treated is more preferably in a range of 1350° C. or more and 1500° C. or less. When the composition is heat-treated at a temperature in the range of 1300° C. or more and 1600° C. or less, the unstable phase in the composition can be decomposed. This enables production of a β-sialon fluorescent material having a light emission peak with a narrow full width at half maximum and a high emission intensity. The thermally decomposed product obtained through the heat treatment in which the unstable phase has been at least partially thermally decomposed may contain, for example, silicon. Silicon contained in thermally decomposed product resulting from the heat treatment of the composition can be removed by a treatment (described later) of contacting the thermally decomposed product with an acidic or basic solution. Thus, a β-sialon fluorescent material with a high emission intensity can be produced.

The heat treatment is preferably carried out in a rare gas atmosphere or in a vacuum. Heat-treating the composition, preferably a β-sialon fluorescent material represented by formula (I), in a rare gas atmosphere or in a vacuum enables the unstable phase of the composition to be at least partially decomposed without destruction of the stable crystal structure.

The rare gas atmosphere contains at least one rare gas selected from the group consisting of helium, neon, and argon, and preferably contains at least argon. The rare gas atmosphere may further contain at least one gas selected from oxygen, hydrogen, and nitrogen in addition to a rare gas. The rare gas content of the rare gas atmosphere is, for example, 95% by volume or more, and preferably 99% by volume or more. The rare gas atmosphere has a pressure in the range of, for example, normal pressure (standard atmospheric pressure: 0.1 MPa) or more and 1 MPa or less, and preferably from normal pressure (standard atmospheric pressure: 0.1 MPa) or more and 0.2 MPa or less.

The heat treatment may be carried out at a reduced pressure lower than normal pressure, and is preferably carried out in a vacuum. The heat treatment in a vacuum refers to a heat treatment at a pressure of, for example, 10 kPa or less, preferably 1 kPa or less, more preferably 100 Pa or less, and also preferably 0.1 Pa or more. A vacuum as used herein does not exclude the presence of a gas. In the vacuum, a gas containing, for example, a rare gas, nitrogen, hydrogen, or oxygen may be present.

The duration of the heat treatment is, for example, in the range of 1 hour or more and 48 hours or less, and preferably in the range of 2 hours or more and 20 hours or less. The heat treatment is carried out by subjecting the composition containing a silicon nitride, or preferably a β-sialon fluorescent material represented by formula (I), to a temperature increase of from room temperature to a predetermined temperature. The time taken for the temperature increase is, for example, in the range of 1 hour or more and 48 hours or less, preferably 2 hours or more 24 hours or less, and more preferably 3 hours or more and 20 hours or less. In the heat treatment step, a retention time at a heat treatment temperature may be provided. The retention time at a heat treatment temperature is, for example, in the range of 1 hour or more and 48 hours or less, preferably in a range of 2 hours or more and 30 hours or less, and more preferably in a range of 3 hours or more and 20 hours or less.

In the heat treatment step, the composition, or preferably a β-sialon fluorescent material having a chemical composition represented by formula (I), may be heat-treated in the presence of a europium-containing compound. Heat-treating the composition in the presence of a europium-containing compound may be preferably carried out in a rare gas atmosphere. Heat-treating the composition in the presence of a europium-containing compound in a rare gas atmosphere allows the europium-containing compound to be at least partially reduced to generate a europium-containing gaseous product. When the composition or preferably a β-sialon fluorescent material having a chemical composition represented by formula (I) contacts with a europium-containing gaseous product during the heat treatment, the europium contained in the composition is presumably easily reduced to divalent. Also, the europium-containing gaseous product contained in the atmosphere is presumably easily incorporated into the composition during the heat treatment. When the europium in the composition is easily reduced from trivalent to divalent, which serves as a light emission center, and when the europium in the gaseous product is easily incorporated into the composition during the heat treatment, the resulting β-sialon fluorescent material has an improved emission intensity.

Examples of the europium-containing compound include europium metal, europium-containing alloys, europium-containing compound, for example, oxides, hydroxides, nitrides, oxynitrides, fluorides, and chlorides. Specific examples include $Eu_2O_3$, EuN, and $EuF_3$. One of these europium-containing compounds may be used alone, or two or more of the europium-containing compounds may be used in combination. The europium-containing compound may have an average particle diameter in the range of, for example, 0.01 µm or more and 20 µm or less, and preferably in the range of 0.1 µm or more and 10 µm or less. The europium-containing compound has a purity of, for example, 95% by mass or more, and 99.5% by mass or more.

When the composition is heat-treated in the presence of the europium-containing compound in the heat treatment step, the europium-containing compound has a mass ratio of, for example, 0.01% by mass or more, preferably 0.05% by mass or more, and more preferably 0.1% by mass or more relative to the composition obtained in the preparation step being taken as 100% by mass. Also, the europium-containing compound has a mass ratio of, for example, 50% by mass or less, preferably 20% by mass or less, more preferably 15% by mass or less, and still more preferably 10% by mass or less relative to the composition obtained in the preparation step being taken as 100% by mass.

When the composition is heat-treated in the presence of the europium-containing compound in the heat treatment step, the composition is caused to contact with a gaseous product to be generated by the europium-containing compound. For example, the composition and the europium-containing compound may be mixed, and the mixture may be heat-treated in the same container.

Temperature-Decrease Step

First Temperature-Decrease Step

The temperature-decrease step includes the first temperature-decrease step of subjecting the heat-treated product to a temperature decrease from the heat treatment temperature to 1000° C., and the second temperature-decrease step of further subjecting the heat-treated product to a temperature decrease from 1000° C. to 400° C. As used herein, the heat treatment temperature refers to a temperature of the atmosphere within the furnace in which the composition or the heat-treated product is arranged. Also, a target temperature, for example, 1000° C. or 400° C., to which the heat-treated product is subjected to a temperature decrease specifically refers to a temperature of the atmosphere within the furnace in which the heat-treated product is arranged. The first temperature-decrease step has a temperature-decrease rate in a range of 1.5° C./min or more and 200° C./min or less. Decreasing the temperature of the heat-treated product from the heat treatment temperature to 1000° C. at a temperature-decrease rate in a range of from 1.5° C./min or more and 200° C./min or less enables removal of amorphous parts in the crystal structure of the heat-treated product, or preferably the β-sialon fluorescent material represented by formula (I), and allows the resulting β-sialon fluorescent material to have a high emission intensity. This is presumably because the activating element is more dispersed in the crystalline parts as a result of the removal of amorphous parts in the fluorescent material. The β-sialon fluorescent material has a skeleton consisting of tetrahedrons of a silicon nitride crystal structure formed with Si or Al, oxygen (O), and/or nitrogen (N). The skeleton has substantially hexagonal prism-shaped voids. In the β-sialon fluorescent material, europium, or an activating element, is presumably arranged in the voids near oxygen (O) in the crystal structure. At high temperatures, europium as an activator can easily move through the crystal structure, and if this state continues, europium is not easily arranged in a stable position in the crystal structure. By subjecting the heat-treated product to a rapid temperature decrease from the heat treatment temperature to 1000° C., europium as an activating element is fixed to a more stable position in the crystal structure of the composition. Thus, europium can more appropriately contribute to emission, and this presumably results in a higher emission intensity. Also, when europium as an activator is arranged in a stable position in the crystal structure through the first temperature-decrease step, the β-sialon fluorescent material represented by formula (I) presumably has a light emission peak with a narrower full width at half maximum.

The first temperature-decrease step preferably has a fast temperature-decrease rate at which the heat-treated product is subjected to a temperature decrease from the heat treatment temperature to 1000° C. to have a light emission peak with a narrower full width at half maximum and a higher emission intensity. The first temperature-decrease step has a temperature-decrease rate in a range of 1.5° C./min or more and 200° C./min or less, preferably in a rage of 2° C./min or more and 200° C./min or less, more preferably in a range of 20° C./min or more and 200° C./min or less, still more preferably in a range of 30° C./min or more, and yet still more preferably from 40° C./min or more. Decreasing the temperature of the heat-treated product from the heat treatment temperature to 1000° C. at a rate of less than 1.5° C./min is too slow to cause the europium to be arranged in a stable position in the crystal structure of the β-sialon fluorescent material, and thus a light emission spectrum with a narrower full width at half maximum cannot be achieved and the emission intensity is low. A temperature-decrease rate exceeding 200° C./min is presumably too fast to achieve a higher emission intensity.

The atmosphere in which the heat-treated product is subjected to a temperature decrease from the heat treatment temperature to 1000° C. is preferably the same atmosphere as the atmosphere during the heat treatment. The atmosphere during the temperature decrease is specifically a rare gas atmosphere or a vacuum. The rare gas atmosphere is preferably the same range of atmosphere as the atmosphere during the heat treatment, and the vacuum is preferably the same range of vacuum as the vacuum during the heat treatment.

Second Temperature-Decrease Step

In the second temperature-decrease step, the heat-treated product is subjected to a temperature decrease from 1000° C. to 400° C. at a temperature decrease rate in a range of 1° C./min or more and 200° C./min or less. The heat-treated product having been subjected to a temperature-decrease to 1000° C. is subjected to a further temperature decrease from 1000° C. to 400° C. at a temperature-decrease rate in a range of 1° C./min or more and 200° C./min or less in the second temperature-decrease step. This allows europium arranged in a stable position in the crystal structure of the heat-treated product, or preferably the β-sialon fluorescent material represented by formula (I), to remain divalent and serve as an emission center. Thus, a β-sialon fluorescent material with a high emission intensity is produced. In the second temperature-decrease step, the temperature-decrease rate of subjecting the heat-treated product to a temperature decrease from 1000° C. to 400° C. is more preferably in a range of 5° C./min or more and 200° C./min or less, still more preferably in a range of 10° C./min or more and 180° C./min or less, yet still more preferably in a range of 15° C./min or more and 150° C./min or less, and particularly preferably in a range of 20° C./min or more and 150° C./min or less.

The atmosphere in which the heat-treated product is subjected to a temperature decrease from 1000° C. to 400° C. is preferably the same atmosphere as the atmosphere during the heat treatment. The atmosphere during the temperature decrease is specifically a rare gas atmosphere or a vacuum. The rare gas atmosphere is preferably the same atmosphere as the atmosphere during the heat treatment, and the vacuum is preferably the same vacuum as the vacuum during the heat treatment.

After-Treatment Step

The method for producing a β-sialon fluorescent material may further include an after-treatment step for after-treating the heat-treated product that has been subjected to the temperature decrease. The after-treatment step preferably includes contacting the heat-treated product that has been subjected to the temperature decrease with an acid solution or a basic solution. Contacting the heat-treated product that has been subjected to the temperature decrease with an acid solution may also be referred to as acid treatment step. Contacting the heat-treated product that has been subjected to the temperature decrease with a basic solution may also be referred to as basic treatment step. Contacting the heat-treated product that has been subjected to the temperature decrease with an acid solution or a basic solution enables removal of the decomposed product decomposed during the heat treatment and contained in the heat-treated product.

Acid Treatment Step

The acid substance contained in the acid solution may be an inorganic acid, such as hydrofluoric acid and nitric acid, or may be hydrogen peroxide. The acid solution is preferably an acid solution containing at least one selected from hydrofluoric acid and nitric acid, and is more preferably a mixed acid solution containing both hydrofluoric acid and nitric acid. The acid solution may further contain, for example, hydrochloric acid in addition to hydrofluoric acid and nitric acid. The duration of contacting of the heat-treated product that has been subjected to the temperature decrease with an acid solution to remove the thermally decomposed product from the heat-treated product is, for example, in a range of 10 minutes or more and 30 hours or less, preferably in a range of 30 minutes or more 25 hours or less, more preferably in a range of 1 hour or more and 25 hours or less. The temperature at which the acid solution is contacted with the heat-treated product is preferably from room temperature (about 20° C.) to 300° C., more preferably in a range of 30° C. or more and 200° C. or less, and still more preferably in a range of 40° C. or more and 150° C. or less to efficiently remove the decomposed product from the heat-treated product.

Basic Treatment Step

Examples of the basic substance contained in the basic solution include an alkali metal-containing hydroxide, or ammonia. The basic substance contained in the basic solution is preferably at least one selected from the group consisting of LiOH, NaOH, KOH, RbOH, CsOH, and $NH_3$.

The basic substance contained in the basic solution is more preferably at least one selected from NaOH and KOH. Instead of preparing a basic solution, a solid basic substance may be contacted with the heat-treated product. To efficiently remove the decomposed product from the heat-treated product, the heat-treated product that has been subjected to the temperature decrease is preferably contacted with a basic solution that contains a basic substance. The duration of contacting of the heat-treated product that has been subjected to the temperature decrease with a basic solution to remove the thermally decomposed product from the heat-treated product is, for example, in a range of 10 minutes or more and 30 hours or less, preferably in a range of 30 minutes or more and 25 hours or less, and more preferably in a range of 1 hour or more and 25 hours or less. To efficiently remove the decomposed product from the heat-treated product, the temperature at which the heat-treated product is contacted with a basic solution is preferably from room temperature (about 20° C.) to 250° C., more preferably in a range of 30° C. or more and 200° C. or less, and still more preferably in a range of 40° C. or more and 150° C. or less.

Washing Step

The method for producing a β-sialon fluorescent material may further include washing the heat-treated product with a liquid medium subsequent to the after-treatment step. Washing the heat-treated product with a liquid medium subsequent to the after-treatment step may be referred to as washing step. Washing the heat-treated product with a liquid medium subsequent to the after-treatment step enables removal of an unnecessary product from the heat-treated product. An example of the liquid medium is deionized water. The duration of washing of the heated product with the liquid medium is, for example, in a range of 10 minutes or more and 30 hours or less, and preferably in a range of 30 minutes or more and 25 hours or less.

The method for producing a β-sialon fluorescent material may further include crushing, pulverizing, and classifying treatment subsequent to the after-treatment. As the classifying treatment, at least one of wet dispersion, wet screening, desiccation, drying, and dry screening is preferably carried out.

β-Sialon Fluorescent Material

A β-sialon fluorescent material obtained through the method according to the embodiment of the present disclosure has a chemical composition represented by formula (I).

$$Si_{6-z}Al_zO_zN_{8-z}:Eu_y \qquad (I)$$

In formula (I), y and z each satisfy $0<y\leq1.0$ and $0<z\leq4.2$.

In the chemical composition represented by formula (I), the parameter y represents the molar ratio of Eu as an activating element. The parameter y is in a range of greater than 0 and 1.0 or less ($0<y\leq1.0$), preferably in a range of 0.0001 or more and 0.5 or less ($0.0001\leq y\leq0.5$), more preferably in a range of 0.0005 or more 0.1 or less ($0.0005\leq y\leq0.1$), and still more preferably in a range of 0.001 or more 0.1 or less ($0.001\leq y\leq0.1$). In formula (I), the parameter z represents the molar ratio of Al or O. In the chemical composition represented by formula (I), the parameter z is in a range of greater than 0 and 4.2 or less ($0<z\leq4.2$), preferably in a range of 0.0001 or more and 1.0 or less ($0.0001\leq z\leq1.0$), more preferably in a range of 0.0001 or more and 0.5 or less ($0.0001\leq z\leq0.5$), still more preferably in a range of 0.0005 or more and 0.5 or less ($0.0005\leq z\leq0.5$), and particularly preferably in a range of 0.001 or more and 0.3 or less ($0.001\leq z\leq0.3$).

A β-sialon fluorescent material obtained by the production method according to the embodiment of the present disclosure may have a small molar ratio of europium, or an activator, in the chemical composition represented by formula (I). However, by subjecting the heat-treated product to the first temperature-decrease step and the second temperature-decrease step each at a specific temperature-decrease rate, the europium is arranged in a stable position, and a β-sialon fluorescent material having a high emission intensity can be produced. Also, even when europium has a small molar ratio in the chemical composition represented by formula (I), by subjecting the heat-treated product to the first temperature-decrease step and the second temperature-decrease step each at a specific temperature-decrease rate, the resulting β-sialon fluorescent material can have a light emission spectrum with a narrow full width at half maximum. A β-sialon fluorescent material produced according to the embodiment of the production method for the present disclosure undergoes temperature-decrease treatment at a specific temperature-decrease rate, and thus can have a higher emission intensity by 1% or more, and preferably 2% or more than the case where the heat-treated product is not subjected to the first temperature-decrease step at a temperature-decrease rate in a range of 1.5° C./min or more and 200° C./min or less subsequent to the heat treatment.

A β-sialon fluorescent material obtained by the production method according to the embodiment of the present disclosure is excited by light from ultraviolet rays to visible light at short wavelengths, and emits light having a peak emission wavelength at longer wavelengths than the excitation light. Light from ultraviolet rays to visible light at short wavelengths is light in a wavelength region mainly from near-ultraviolet light to blue light. Specifically, the β-sialon fluorescent material is excited by light having a peak emission wavelength in the range of 250 nm or more and 480 nm or less, and emits fluorescent having a peak emission wavelength in the range of 520 nm or more and 560 nm or less. Excitation light having a peak emission wavelength in the range of 250 nm or more and 480 nm or less allows the β-sialon fluorescent material to emit light with a high emission efficiency.

EXAMPLES

The present invention is hereunder specifically described by reference to the following Examples. The present invention is not limited to these Examples.

Example 1

Preparation Step

As raw materials, a first silicon oxynitride and a second silicon oxynitride were prepared. The first silicon oxynitride has an oxygen content of 0.57% by mass, and a specific surface area determined by the BET method of 6.5 m²/g. The second silicon oxynitride has an oxygen content of 1.16% by mass, and a specific surface area determined by the BET method of 10 m²/g. Each BET specific surface area was determined using an automatic specific surface area analyzer (GEMINI 2375 manufactured by Micromeritics).

The first silicon oxynitride, aluminium nitride (AlN), and europium oxide ($Eu_2O_3$) were weighed and mixed to be a molar ratio of Si:Al:Eu of 5.95:0.05:0.005 to obtain a first mixture. The first mixture was filled into a boron nitride crucible, and was subjected to first calcining at 2000° C. for 10 hours in a nitrogen atmosphere with a nitrogen gas content of 99% by volume or more at a gauge pressure of 0.92 MPa to obtain a first calcined product. The first calcined product was a β-sialon fluorescent material having a chemical composition represented by formula (I) where the molar ratio of Eu was 0.004, and the molar ratio of Al was 0.05.

The resultant first calcined product, the second silicon oxynitride, aluminium nitride, and europium oxide were weighed and mixed to be a second mixture with the first calcined product-content of 10% by mass, and a molar ratio of Si:Al:Eu of 5.95:0.05:0.005. The second mixture was filled into a boron nitride crucible, and was subjected to second calcining at 1980° C. for 10 hours in a nitrogen atmosphere with a nitrogen gas content of 99% by volume or more at a gauge pressure of 0.92 MPa to obtain a second calcined product. The second calcined product was a β-sialon fluorescent material having a chemical composition represented by formula (I) where the molar ratio of Eu was 0.004, and the molar ratio of Al was 0.05.

The resultant second calcined product and europium oxide were weighed and mixed in a manner to obtain a third mixture that has a molar ratio of Eu in the second calcined product relative to Eu in europium oxide of 0.004:0.002. The third mixture was placed into a porcelain with a medium, and pulverized for 8 hours. The pulverized third mixture was subjected to third calcining at 2000° C. for 10 hours in a nitrogen atmosphere with a nitrogen gas content of 99% by volume or more at a gauge pressure of 0.92 MPa to obtain a third calcined product. The third calcined product was a β-sialon fluorescent material having a chemical composition represented by formula (I) where the molar ratio of Eu was 0.005, and the molar ratio of Al was 0.05.

Heat-Treatment Step

The β-sialon fluorescent material having a chemical composition represented by formula (I) and prepared in the preparation step was placed in a mortar, and coarsely crushed at room temperature, and then subjected to classifying treatment including wet dispersion. The classified composition was heat-treated in a furnace at a temperature increased from room temperature to 1400° C. for 5 hours in an argon atmosphere created by causing argon with an argon content of 99% by volume or more to flow into the furnace at a rate of 2.0 L/min under normal pressure (standard atmospheric pressure: 0.1 MPa) to obtain a heat-treated product.

Temperature-Decrease Step

The resultant heat-treated product was subjected to a first temperature-decrease from 1400° C. (t1), or the heat treatment temperature, to 1000° C. (t2) at a temperature-decrease rate of 100° C./min. The heat-treated product having been subjected to the first temperature-decrease was then subjected to the second temperature-decrease from 1000° C. (t1) to 400° C. (t2) at a temperature-decrease rate of 25° C./min. The first temperature-decrease step and the second temperature-decrease step were carried out in the same atmosphere as the atmosphere of the heat treatment.

Basic Treatment Step

The heat-treated product having been subjected to the first temperature-decrease and the second temperature-decrease was then contacted with an aqueous sodium hydroxide containing NaOH in an amount of 20% by mass at 105° C. for 20 hours as basic treatment.

After-Treatment Step

The heat-treated product having been subjected to the basic treatment was then washed with deionized water, and dried to obtain a β-sialon fluorescent material having a chemical composition represented by formula (I) where the molar ratio of Eu was 0.005, and the molar ratio of Al was 0.05.

Example 2

A β-sialon fluorescent material having a chemical composition represented by formula (I) where the molar ratio of Eu was 0.005 and the molar ratio of Al was 0.05 was obtained in the same manner as in Example 1 except that the temperature-decrease rate in the first temperature-decrease step was changed to 40° C./min.

Example 3

A β-sialon fluorescent material having a chemical composition represented by formula (I) where the molar ratio of Eu was 0.005 and the molar ratio of Al was 0.05 was obtained in the same manner as in Example 1 except that the temperature-decrease rate in the first temperature-decrease step was changed to 20° C./min.

Example 4

A β-sialon fluorescent material having a chemical composition represented by formula (I) where the molar ratio of Eu was 0.005 and the molar ratio of Al was 0.05 was obtained in the same manner as in Example 1 except that the temperature-decrease rate in the first temperature-decrease step was changed to 2° C./min.

Comparative Example 1

A β-sialon fluorescent material having a chemical composition represented by formula (I) where the molar ratio of Eu was 0.005 and the molar ratio of Al was 0.05 was obtained in the same manner as in Example 1 except that the temperature-decrease rate in the first temperature-decrease step was changed to 1° C./min.

Example 5

A β-sialon fluorescent material having a chemical composition represented by formula (I) where the molar ratio of Eu was 0.005 and the molar ratio of Al was 0.05 was obtained in the same manner as in Example 1 except that the temperature-decrease rate in the second temperature-decrease step was changed to 5° C./min.

Example 6

A β-sialon fluorescent material having a chemical composition represented by formula (I) where the molar ratio of Eu was 0.005 and the molar ratio of Al was 0.05 was obtained in the same manner as in Example 1 except that the temperature-decrease rate in the second temperature-decrease step was changed to 1° C./min.

Evaluation

Light Emitting Properties and Full Width at Half Maximum

For each β-sialon fluorescent material obtained in Examples and Comparative Example 1, light emitting properties were determined. The light emitting properties of each β-sialon fluorescent material were determined using a spectrofluorometer (QE-2000 manufactured by Otsuka Electronics) with an excitation light having a wavelength of 450 nm. The energy (relative emission intensity: %) of each emission spectrum was determined. Each relative emission intensity was calculated relative to the emission intensity of the β-sialon fluorescent material of Comparative Example 1 as 100%. A full width at half maximum (FWHM) of a maximum spectral emission peak is a wavelength width at a value equal to 50% of the maximum value of a maximum spectral emission peak. The full width at half maximums of Examples and Comparative Example 1 were calculated. Table 1 shows the results.

Chromaticity x, y

For each β-sialon fluorescent material of Examples and Comparative Example 1, the chromaticity (x, y) values in x, y chromaticity coordinates in accordance with Commission Internationale de l'Eclairage (CIE) 1931 were calculated using data from the emission spectrum and data from the color filter permeability curve in a simulation where each β-sialon fluorescent material was used as a light source in a liquid crystal display. Table 1 shows the results.

SEM Micrograph

Figure 1:
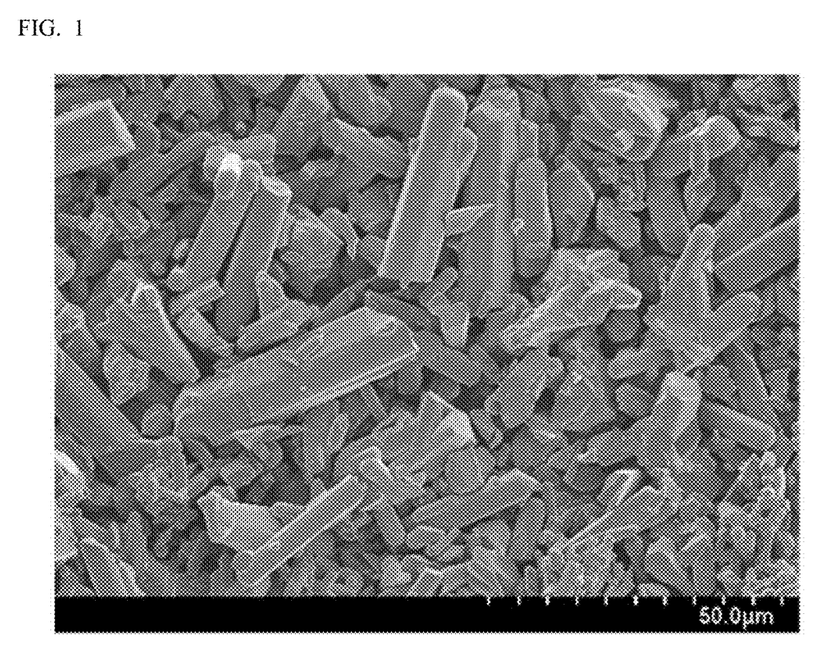
FIG. 1 is a scanning electron microscope (SEM) micrograph of a β-sialon fluorescent material obtained by the method according to Example 1.
Figure 2:
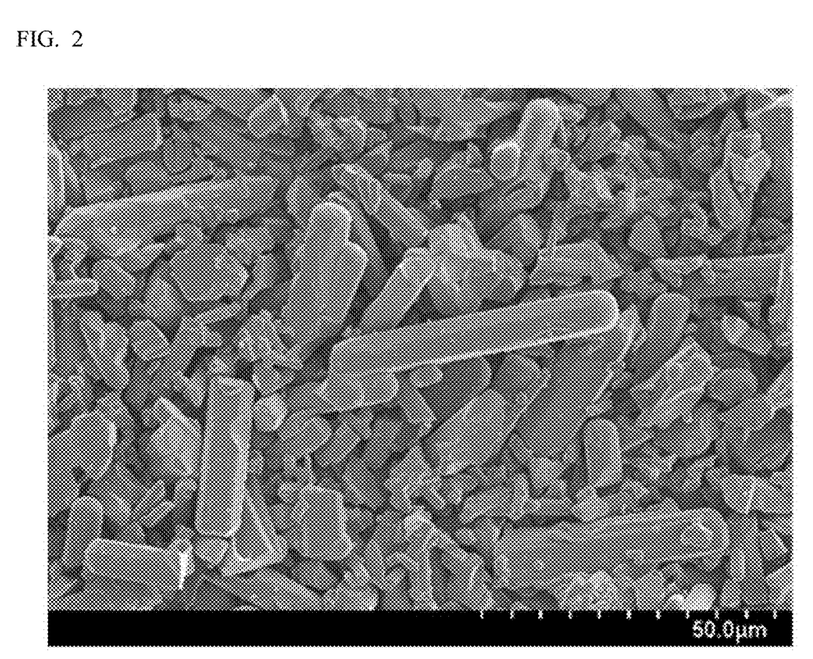
FIG. 2 is a SEM micrograph of a β-sialon fluorescent material obtained by the method according to Comparative Example 1.

For each β-sialon fluorescent material of Example 1 and Comparative Example 1, an SEM micrograph was obtained using a scanning electron microscope (SEM). FIG. 1 is an SEM micrograph of a β-sialon fluorescent material obtained by the production method of Example 1, and FIG. 2 is an SEM micrograph of a β-sialon fluorescent material obtained by the production method of Comparative Example 1.

Examples 1 to 4 presumably maintained crystallinity. The β-sialon fluorescent materials obtained by the production method of Examples 1 to 4 with a higher temperature-decrease rate from the heat treatment temperature to 1000° C. tend to have a smaller chromaticity x and a greater chromaticity y, and the chromaticity appears at shorter wavelengths than the β-sialon fluorescent material obtained in Comparative Example 1.

Comparison of the β-sialon fluorescent materials obtained by the production method of Examples 1, 5 and 6 reveals that emission intensity is higher when the temperature-decrease rate in the second temperature-decrease step is higher. Comparison of the β-sialon fluorescent materials obtained by the production method of Examples 5 and 6 reveals that the β-sialon fluorescent material obtained by the production method of Example 5, which has been subjected to a temperature decrease at a higher temperature-decrease rate in the second temperature-decrease step, has a higher emission intensity. The β-sialon fluorescent materials obtained by the production method of Examples 1, 5 and 6 are not much different from one another in full width at half

TABLE 1

| | Temperature decrease rate (° C./min) | | Emission properties | | | |
|---|---|---|---|---|---|---|
| | First temperature decrease step | Second temperature decrease step | Relative Emission intensity | Chromaticity | | Full Width at Half Maximum |
| | 1400° C. to 1000° C. | 1000° C. to 400° C. | (%) | x | y | (nm) |
| Example 1 | 100 | 25 | 105.7 | 0.294 | 0.669 | 50.6 |
| Example 2 | 40 | 25 | 102.6 | 0.297 | 0.666 | 51.4 |
| Example 3 | 20 | 25 | 101.3 | 0.298 | 0.665 | 51.9 |
| Example 4 | 2 | 25 | 101.4 | 0.301 | 0.663 | 52.3 |
| Comparative Example 1 | 1 | 25 | 100.0 | 0.302 | 0.662 | 52.5 |
| Example 5 | 100 | 5 | 103.9 | 0.296 | 0.667 | 51.3 |
| Example 6 | 100 | 1 | 100.1 | 0.296 | 0.667 | 51.5 |

As shown in Table 1, the β-sialon fluorescent materials obtained by the production methods of Examples 1 to 4 have a emission peak spectrum with a narrower full width at half maximum and a higher relative emission intensity when having a higher temperature-decrease rate in the first temperature-decrease step. These results show that europium serving as an emission center is presumably more stably arranged in the crystal structure of the β-sialon fluorescent material when the β-sialon fluorescent material is subjected to a temperature-decrease from the heat treatment temperature to 1000° C. at a higher temperature-decrease rate among the β-sialon fluorescent materials obtained by the methods of Examples 1 to 4. Although the β-sialon fluorescent material obtained by the production method of Example 3 and the β-sialon fluorescent material obtained by the production method of Example 4 are not much different from each other in relative emission intensity, the β-sialon fluorescent material obtained by the production method of Example 3 with a higher temperature-decrease rate in the first temperature-decrease step has a narrower full width at half maximum. Thus, with a higher temperature-decrease rate in the first temperature-decrease step, a β-sialon fluorescent material with a narrower full width at half maximum is produced. Also, even with a higher temperature-decrease rate in the first temperature-decrease step, the β-sialon fluorescent materials obtained by the production method of maximum and chromaticity (x, y). This reveals that the temperature-decrease rate in the second temperature-decrease step mainly affects the emission intensity of the β-sialon fluorescent materials. The β-sialon fluorescent material obtained by the production method of Example 6 has a lower relative emission intensity than the β-sialon fluorescent materials obtained by the production method of Examples 1 and 5. This is presumably because at least a part of europium has changed from divalent to trivalent, and ceased to function as an emission center in the β-sialon fluorescent material obtained by the production method of Example 6, although the position of europium in crystal structure is not different from the position of europium in crystal structure of the β-sialon fluorescent materials obtained by the production method of Examples 1 and 5.

The β-sialon fluorescent material obtained by the production method of Comparative Example 1 is not much different from the β-sialon fluorescent material obtained by the production method of Example 1 in average particle diameter. The β-sialon fluorescent material obtained by the production method of Comparative Example 1 is produced through the first temperature-decrease step at a lower temperature-decrease rate, and has a light emission spectrum with a wider full width at half maximum than the β-sialon fluorescent material obtained by the production method of Example 1.

This is presumably because at least a part of the europium, or the emission center, is off the stable position in the crystal structure.

The particle shapes of the β-sialon fluorescent material obtained by the production method of Example 1 and shown in the SEM micrograph of FIG. 1 are not much different from the particle shapes of the β-sialon fluorescent material obtained by the production method of Comparative Example 1 and shown in the SEM micrograph of FIG. 2.

A light-emitting device including a β-sialon fluorescent material produced by the method according to an embodiment of the present disclosure can be used in a wide range of applications, for example, as a light source for displays, backlighting, general lighting, and in-vehicle lighting.

The invention claimed is:

1. A method for producing a β-sialon fluorescent material, comprising:
preparing a composition containing a silicon nitride that contains aluminium, oxygen, and europium;
heat-treating the composition at a temperature in a range of 1300° C. or more and 1600° C. or less to obtain a heat-treated product;
subjecting the heat-treated product to a temperature decrease from the temperature of the heat-treating to 1000° C. as a first temperature-decrease step; and
subjecting the heat-treated product to a temperature decrease from 1000° C. to 400° C. as a second temperature-decrease step,
wherein the first temperature-decrease step has a temperature-decrease rate in a range of 30° C./min or more and 200° C./min or less, and the second temperature-decrease step has a temperature-decrease rate in a range of 5° C./min or more and 200° C./min or less, and
wherein the temperature decrease rate in the first temperature-decrease step is faster than the temperature decrease rate in the second temperature-decrease step,
wherein a full width at half maximum of a light emission peak of a light emission spectrum of the β-sialon fluorescent material is in a range of 50.6 nm or more and 51.4 nm or less and the composition of the β-sialon fluorescent material has a chemical composition represented by formula (I):

$$Si_{6-z}Al_zO_zN_{8-z}:Eu_y \qquad (I)$$

wherein y and z each satisfy 0<y≤1.0 and 0<z≤4.2.

2. The method for producing a β-sialon fluorescent material according to claim 1, wherein the first temperature-decrease step has a temperature-decrease rate in a range of 40° C./min or more and 200° C./min or less.

3. The method for producing a β-sialon fluorescent material according to claim 1, wherein the first temperature-decrease step has a temperature-decrease rate in a range of 100° C./min or more and 200° C./min or less.

4. The method for producing a β-sialon fluorescent material according to claim 1, wherein the second temperature-decrease step has a temperature-decrease rate in a range of 10° C./min or more and 180° C./min or less.

5. The method for producing a β-sialon fluorescent material according to claim 1, wherein the second temperature-decrease step has a temperature-decrease rate in a range of 15° C./min or more and 150° C./min or less.

6. The method for producing a β-sialon fluorescent material according to claim 1, wherein the heat-treating is carried out in a rare gas atmosphere or in a vacuum.

7. The method for producing a β-sialon fluorescent material according to claim 1, further comprising contacting the heat-treated product with an acid solution or a basic solution after the second temperature-decrease step.

8. The method for producing a β-sialon fluorescent material according to claim 7, wherein the acid solution contains at least one selected from the group consisting of hydrofluoric acid and nitric acid.

9. The method for producing a β-sialon fluorescent material according to claim 7, wherein the basic solution contains at least one selected from the group consisting of sodium hydroxide and potassium hydroxide.

10. The method for producing a β-sialon fluorescent material according to claim 8, wherein the acid solution contains both hydrofluoric acid and nitric acid.

11. The method for producing a β-sialon fluorescent material according to claim 1, wherein y satisfies 0.0001≤y≤0.5.

12. The method for producing a β-sialon fluorescent material according to claim 1, wherein z satisfies 0.0001≤z≤0.5.

13. The method for producing a β-sialon fluorescent material according to claim 1, wherein the second temperature-decrease step has a temperature-decrease rate in a range of 20° C./min or more and 150° C./min or less.

14. The method for producing a β-sialon fluorescent material according to claim 7, further comprising washing the heat-treated product with a liquid medium after contacting the heat-treated product with the acid solution or the basic solution.